(12) United States Patent
Kwolek (10) Patent No.: US 8,783,921 B2
(45) Date of Patent: Jul. 22, 2014

(54) LIGHT HOUSING FOR VEHICLE GLOVE BOX

(75) Inventor: Chad Kwolek, Hartland, MI (US)

(73) Assignee: Nissan North America, Inc., Franklin, TN (US)

( * ) Notice: Subject to any disclaimer, the term of this patent is extended or adjusted under 35 U.S.C. 154(b) by 272 days.

(21) Appl. No.: 13/287,247

(22) Filed: Nov. 2, 2011

(65) Prior Publication Data

US 2013/0107556 A1 May 2, 2013

(51) Int. Cl.
*B60Q 3/06* (2006.01)
*B60Q 3/02* (2006.01)
*B60R 7/06* (2006.01)

(52) U.S. Cl.
CPC .. *B60R 7/06* (2013.01); *B60Q 3/022* (2013.01)
USPC ........... 362/488; 362/546; 362/549; 362/154; 362/364

(58) Field of Classification Search
USPC ......... 362/488, 490, 549, 546, 154, 155, 133, 362/364; 296/37.12
See application file for complete search history.

(56) References Cited

U.S. PATENT DOCUMENTS

| 1,783,311 | A | * | 12/1930 | Schepmoes | 362/479 |
|---|---|---|---|---|---|
| 1,997,701 | A | * | 4/1935 | Smith | 362/133 |
| 2,789,861 | A | * | 4/1957 | Hudson | 296/37.12 |
| 2,846,261 | A | * | 8/1958 | Nickles | 362/496 |
| 4,109,955 | A | * | 8/1978 | Amann et al. | 296/37.1 |
| 4,239,277 | A | * | 12/1980 | Oda | 296/37.12 |
| 4,743,060 | A | * | 5/1988 | Hishida | 296/37.12 |
| 7,147,341 | B2 | * | 12/2006 | Nowak et al. | 362/133 |
| 7,566,154 | B2 | * | 7/2009 | Gloisten et al. | 362/545 |
| 7,748,887 | B2 | * | 7/2010 | Zampini et al. | 362/655 |
| 2003/0072166 | A1 | * | 4/2003 | Sinzawa et al. | 362/488 |
| 2010/0001539 | A1 | * | 1/2010 | Kikuchi et al. | 292/138 |
| 2011/0175376 | A1 | * | 7/2011 | Whitens et al. | 292/251.5 |

* cited by examiner

*Primary Examiner* — Ismael Negron
(74) *Attorney, Agent, or Firm* — Young, Basile, Hanlon & MacFarlane, P.C.

(57) ABSTRACT

A glove box assembly defines a storage cavity for a vehicle, such storage cavity including a wall with a perimeter edge defining a light aperture, and a light housing is adjacent to the wall and aligned with the light aperture. A flange extends from the light housing into the light aperture adjacent to at least a portion of the perimeter edge of the light aperture.

15 Claims, 7 Drawing Sheets

LIGHT HOUSING FOR VEHICLE GLOVE BOX

TECHNICAL FIELD

The invention relates in general to light assemblies and in particular to a light assembly for a glove box assembly in a vehicle.

BACKGROUND

A typical vehicle includes a glove box assembly within the dashboard to provide storage space for users of the vehicle. A glove box assembly includes a storage cavity, and a wall of the storage cavity can also include a perimeter edge defining a light aperture through which a light source can provide illumination to the storage cavity. The perimeter edge defining the light aperture can have rough or sharp corners resulting from forming the aperture during molding of the wall. The exposed rough or sharp corner or corners may come into contact with objects stored in the storage cavity, which can cause damage to the wall or mar the objects. Therefore, there is a need for the prevention of contact with rough or sharp portions of the exposed corners of a perimeter edge in the storage cavity of a vehicle glove box without the addition of extra components and without sacrificing storage space.

SUMMARY

Disclosed herein are embodiments of light assemblies included in glove box assemblies. In one illustrative embodiment, the glove box assembly defines a storage cavity for a vehicle. The storage cavity has a wall having a perimeter edge defining a light aperture, and a light housing is adjacent to the wall and aligned with the light aperture. A flange extends from the light housing into the light aperture adjacent to at least a portion of the perimeter edge.

In another illustrative embodiment, a light assembly for a wall of a vehicle glove box assembly with a storage cavity comprises a light housing, a flange and a lamp aperture. The light housing is configured to circumscribe a light aperture defined by a perimeter edge of the wall. A flange is integral with the light housing and extends adjacent to at least a portion of the perimeter edge of the wall. The lamp aperture is defined by the light housing and is configured to receive a lamp for illuminating the storage cavity.

BRIEF DESCRIPTION OF THE DRAWINGS

The various features, advantages and other uses of the present apparatus will become more apparent by referring to the following detailed description and drawings in which.

DETAILED DESCRIPTION

All references to "front", "forward" and the like, and all references to "rear", "rearward" and the like used to describe the embodiments disclosed herein are used with reference to a longitudinal direction of a vehicle. "Front", "forward" and the like refer to the front (fore) of a vehicle, while "rear", "rearward" and the like refer to the back (aft) of a vehicle.

Figure 1:
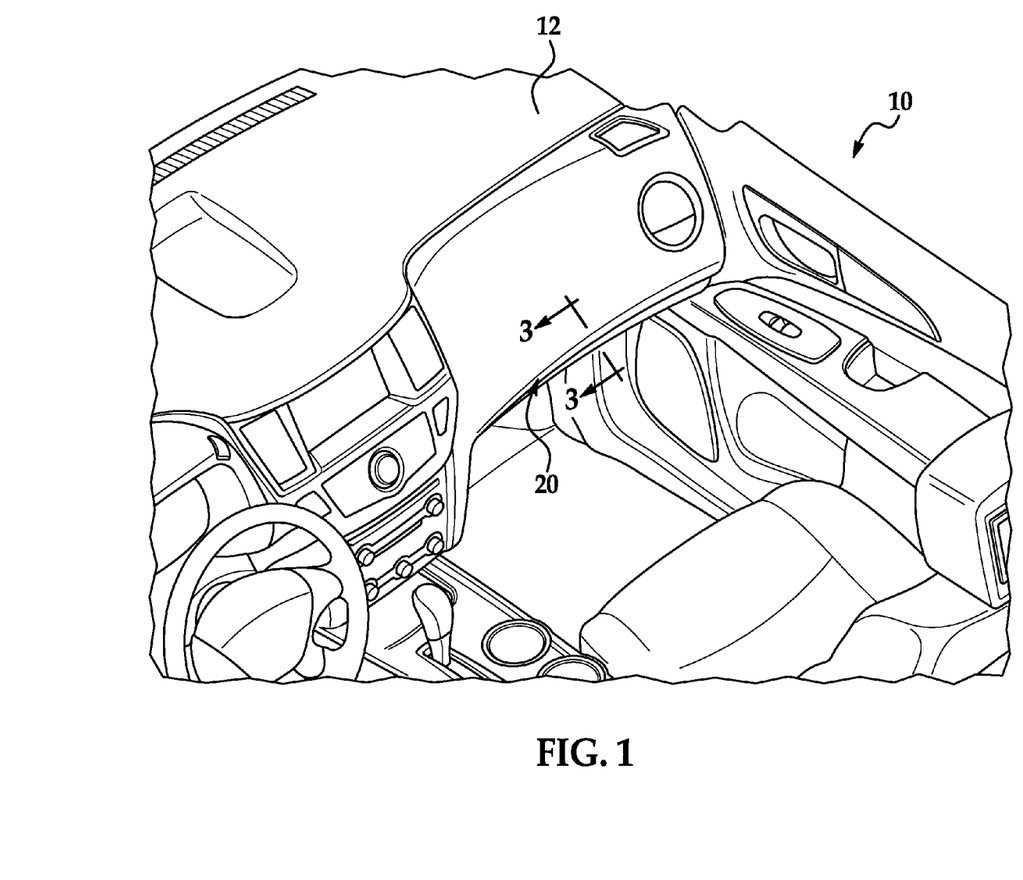
FIG. 1 is a perspective view of a vehicle interior.

The front passenger compartment of a vehicle interior 10 is shown in FIG. 1. A dash 12 extends transversely across the vehicle forward of the passenger compartment and serves as a forward boundary of the vehicle interior 10. A glove box assembly 20 is located in the dash 12, and can be positioned on the rearward under-side of the dash 12 as shown in FIG. 2.

Figure 2:
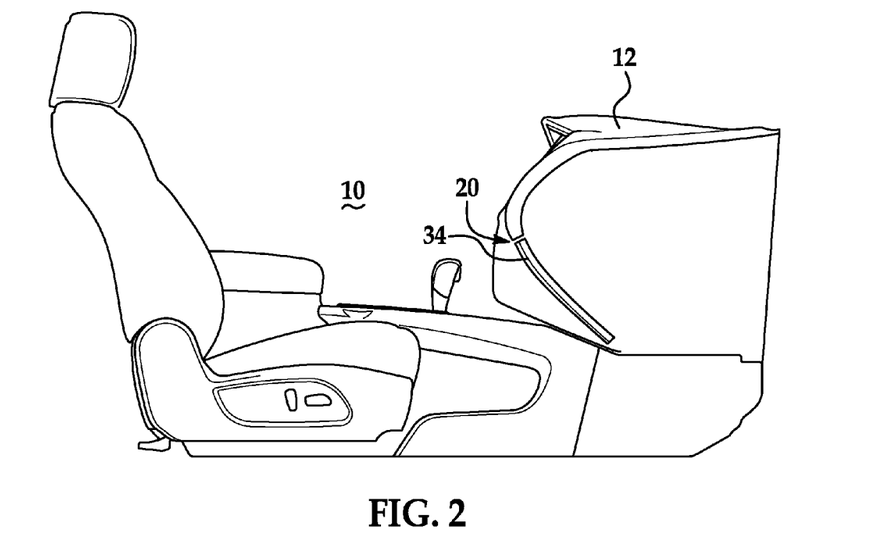
FIG. 2 is a side elevation view of the vehicle interior shown in FIG. 1.

FIG. 2 is a side elevation view of the vehicle interior 10 shown in FIG. 1. The glove box assembly 20 can be positioned on the rearward under-side of the dash 12 to provide storage space within the passenger compartment. The glove box assembly 20 includes a glove box door 34, which is shown in a closed position.

Figure 3:
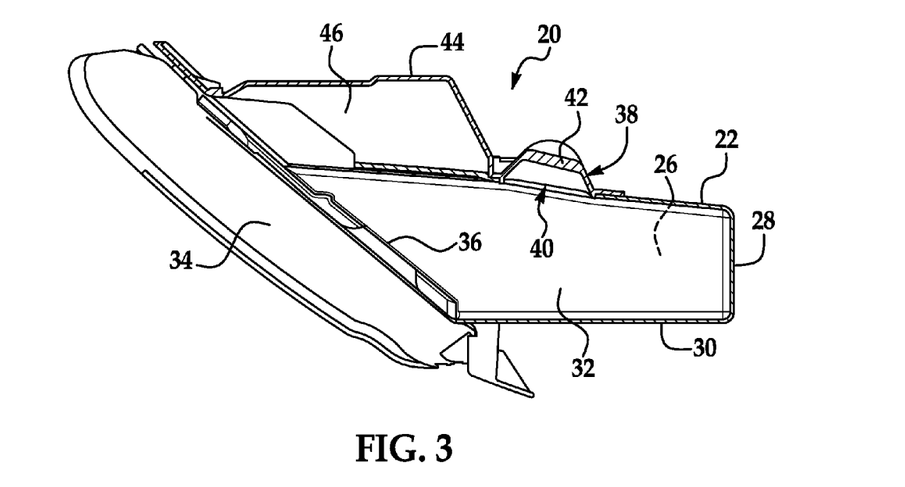
FIG. 3 is a cross sectional view of the a glove box assembly shown in FIG. 1 taken along the line 3-3.

FIG. 3 is a cross section view of the glove box assembly 20 shown in FIGS. 1 and 2. The glove box assembly 20 has a plurality of walls, including a top wall 22, a first side wall 26 opposing a second side wall (not shown), a front wall 28 and a bottom wall 30 opposing the top wall 22. The walls 22, 26, 28 and 30 define a storage cavity 32. Although the walls 22, 26, 28 and 30 are illustrated as substantially planar and forming a box-like storage cavity 32, any arrangement or combination of planar or non-planar wall surfaces could be used to form a storage cavity suitable for providing storage. At a rear of the storage cavity 32 is an access opening 36 to provide access to the storage cavity 32. The glove box door 34 adjacent to the access opening 36 and rotatably connected near or to the bottom wall 30. The glove box door 34 is rotatable between a closed position to conceal the access opening 36 of the storage cavity 32 and an open position (not shown) to expose the access opening 36 of the storage cavity 32.

A light assembly 38 is provided for the storage cavity 32. The light assembly 38 includes a light aperture 40 defined by the top wall 22 of the glove box assembly 20 and a light housing 42 positioned exterior to the top wall 22 of the storage cavity 32 and aligned with the light aperture 40. The light housing 42 defines a lamp aperture 50 (shown in FIG. 5) sized to receive a lamp socket 70 (shown in FIG. 5) to provide illumination to the storage cavity 32 through the light aperture 40.

The glove box assembly 20 further includes a glove box cover 44 extending from proximate to the glove box door 34 and spaced from the top wall 22. The glove box cover 44 can extend from proximate to the glove box door 34 to the top wall 22 to enclose any space between the glove box door 34 and the top wall 22 that is not enclosed by the top wall 22. The glove box cover 44 can also extend over a portion of the top wall 22, as shown in FIG. 3, to define an additional storage space 46. As shown in FIG. 3, the glove box cover 44 includes the light housing 42, and acts to hold the light housing 42 in alignment with the light aperture 40. Although the light housing 42 is illustrated as an integral component of a glove box cover 44 in FIG. 3, the light housing 42 can also be provided separately from the glove box cover 44. If the light housing 42 is provided separately from the glove box cover 44, the light housing 42 can be held in alignment with the light aperture 40 by, for example, attaching the light housing 42 to the top wall 22 or the glove box cover 44. The attachment can be made using any available method, such as snap-fitting, fastening or adhering the light housing 42 to the top wall 22 or the glove box cover 44.

Figure 4:
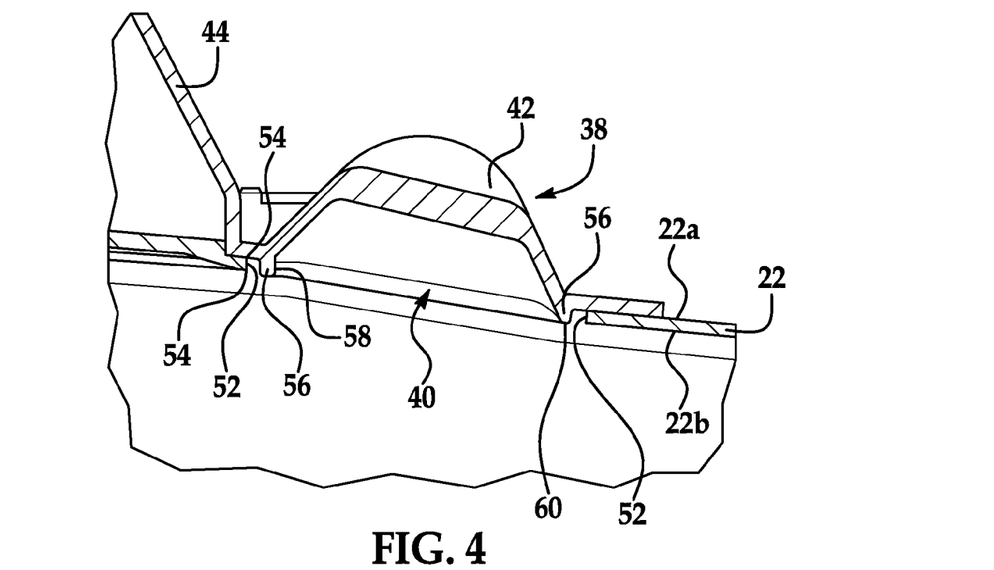
FIG. 4 is an enlarged view of the light housing and perimeter edge shown in FIG. 3.

FIG. 4 is an enlarged cross sectional view of the light assembly 38 including the light aperture 40 and light housing 42 shown in FIG. 3. The light aperture 40 is defined by a perimeter edge 52 formed in the top wall 22 between a top surface 22a and an interior surface 22b of the top wall 22. The respective intersections of the perimeter edge 52 with the top surface 22a and the interior surface 22b of the top wall 22 form corners 54 at a substantially right angle around the perimeter edge 52. These corners 54 can be rough or sharp, for example. Such corners 54 may be apt to form around the perimeter edge 52 due to, for example, the molding technique used to manufacture the walls 22, 26, 28 and 30 of the glove box assembly 20 or the forming of the light aperture 40.

In the embodiment illustrated in FIG. 4, the light housing 42 includes a flange 56 extending vertically downward from the light housing 42. When the light housing 42 is aligned with the light aperture 40, the flange 56 extends adjacent to one or more portions of the perimeter edge 52 to impede contact with corresponding portions of one or both of the corners 54 from within the storage cavity 32. The flange 56 extends from the light housing 42 to form a continuous smooth contact surface 58 to prevent contact of objects positioned in the storage cavity 32 with the corners 54 or perimeter edge 52 of the light aperture 40. The flange 56 can extend downward from the light housing 42 through the light aperture 40 to position a distal end 60 of the flange 56 to be flush with the interior surface 22b of the top wall 22, or the distal end 60 of the flange 56 can extend beyond interior surface 22b. Because the distal end 60 of the flange 56 can be contacted from within the storage cavity 32, the distal end 60 is rounded. The distal end 60 could alternatively be chamfered or otherwise smoothed or softened as desired or required.

Although the light aperture 40 is illustrated in the top wall 22 of the glove box assembly 20, with the flange 56 extending vertically downward adjacent to the perimeter edge 52, the light aperture 40 can be included in any wall of the glove box assembly 20 so as to allow light from a light housing 42 aligned with the light aperture 40 to illuminate the storage cavity 32, and the orientation of the light housing 42 and the flange 56 with respect to the light aperture 40 can vary accordingly. In addition, the scope of the embodiment is not limited to a glove box assembly. For example, any vehicle panel may define an aperture for allowing light from a light housing to pass through the light aperture to illuminate a space opposite the light housing. If a portion of the perimeter edges defining any such light aperture includes corners that are prone to contact, the light housing can include a flange extending adjacent to some or all of those portions of the perimeter edge to prevent contact with its corners.

Figure 5:
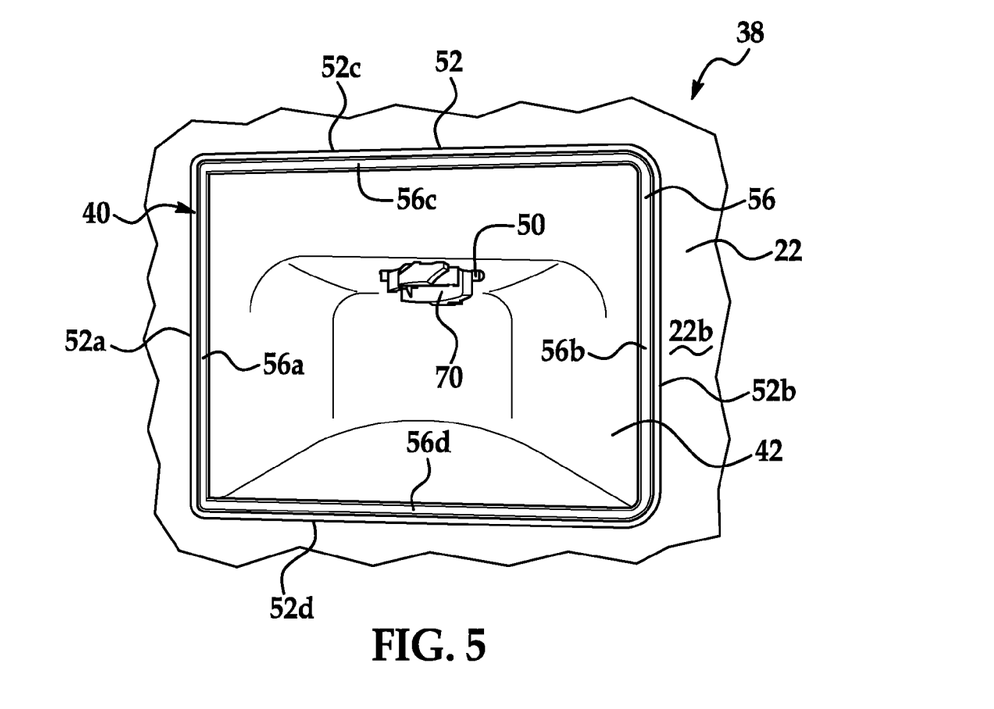
FIG. 5 is a bottom elevation view of the light housing and perimeter edge shown in FIG. 4.

FIG. 5 is a bottom elevation view of the light aperture 40 showing the light housing 42 and flange 56 aligned with the light aperture 40. The lamp aperture 50 in the light housing 42 provides clearance for a light socket 70, which can include a lamp (not shown) to provide illumination to the storage cavity 32 through the light aperture 40. The light aperture 40 is illustrated as generally rectangular, with a rearward edge 52a, a forward edge 52b and opposing side edges 52c and 52d, and the intersections between adjacent edges can be rounded. Although the light aperture 40 is illustrated as rectangular, light aperture 40 can be any suitable shape, such as rhomboid, polygonal, circular or ovoid.

In FIG. 5, flange 56 is annular and extends adjacent to the entire perimeter edge 52. For instance, as shown, the flange 56 can have a rearward segment 56a, side segments 56c and 56d, and a forward segment 56b extending along corresponding edges 52a-d of the perimeter edge 52. However, the flange 56 can extend adjacent to all or any portion of the perimeter edge 52. For example, the flange 56 can alternatively extend adjacent only to a portion of the perimeter edge 52. If, for example, the rearward edge 52a is the edge most prone to contact from within the storage cavity 32 because of its relative proximity to the access opening 36 of the storage cavity 32, the flange 56 can extend adjacent only the rearward edge 52a. Cost can be saved and the mass of the light housing 42 can be reduced by providing a flange 56 extending only along the rearward edge 52a between the opposing side edges 52c and 52d. In addition, the flange 56 does not have to extend to a continuous portion of the perimeter edge 52. For example, a flange 56 can extend adjacent to a plurality of portions of the perimeter edge 52.

In addition to or as an alternative to utilizing a flange 56 extending from the light housing 42 adjacent to at least a portion of the perimeter edge 52 to prevent contact with a corresponding portion of one or both of the corners 54 and/or edge 52 from within the storage cavity 32, one or both of the corners 54 can be rounded along a portion of the perimeter edge 52 to avoid forming a right angle at the intersection of the peripheral edge 52 and the interior surface 22b and/or the top surface 22a. For example, if a portion of the perimeter edge 52 is not protected by the flange 56, the corners 54 along that portion can be rounded as permitted by the molding process, by a parting line for example, in order to reduce the chances of undesired contact with that portion.

Figure 6:
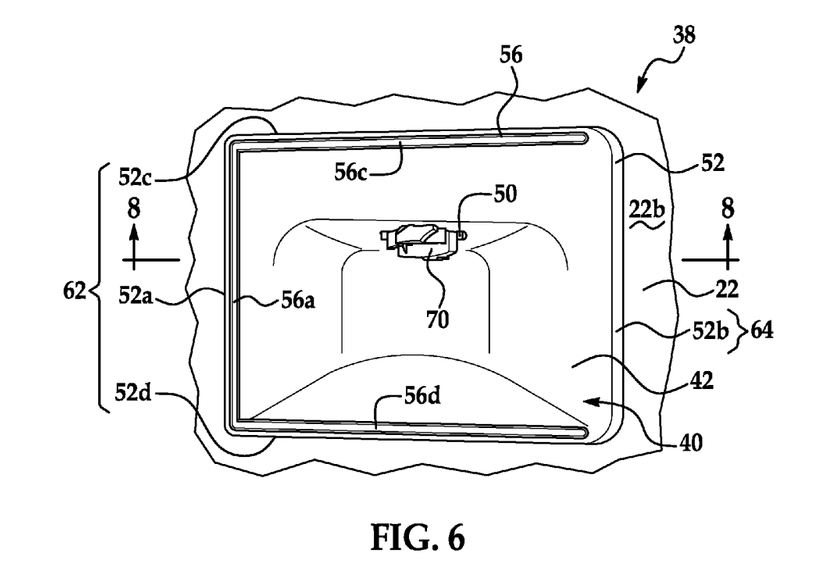
FIG. 6 is a bottom elevation view of an alternative embodiment of a light housing and a perimeter edge.
Figure 7:
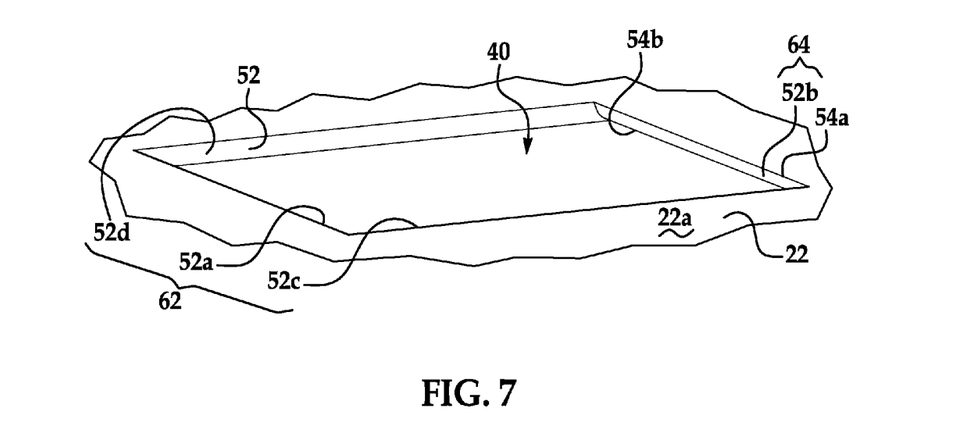
FIG. 7 is a top perspective view of the perimeter edge shown in FIG. 6.

FIG. 6 is a bottom elevation view of an alternative embodiment of a light housing 42 and a perimeter edge 52 defining a light aperture 40. As shown in FIG. 6, the perimeter edge 52 has a first portion 62 and a second portion 64. The first portion 62 of the perimeter edge 52 includes the rearward edge 52a and each of the side edges 52c and 52d. The flange 56 is continuous and includes segments 56a, 56c and 56d extending along the first portion 62. The second portion 64 of the perimeter edge 52 includes the forward edge 52b, and one or more of the corners 54 of the perimeter edge 52 can be rounded along the second portion 64. FIG. 7 is a perspective top view of the perimeter edge 52 shown in FIG. 6. The forward edge 52b of the perimeter edge 52 has a corner 54a at the intersection with the top surface 22a of the wall 22 and a corner 54b at the intersection with the interior surface 22b of the wall 22. As illustrated in FIG. 7, the corner 54b along the interior surface 22b can be rounded along the second portion 64 of the perimeter edge 52.

Figure 8:
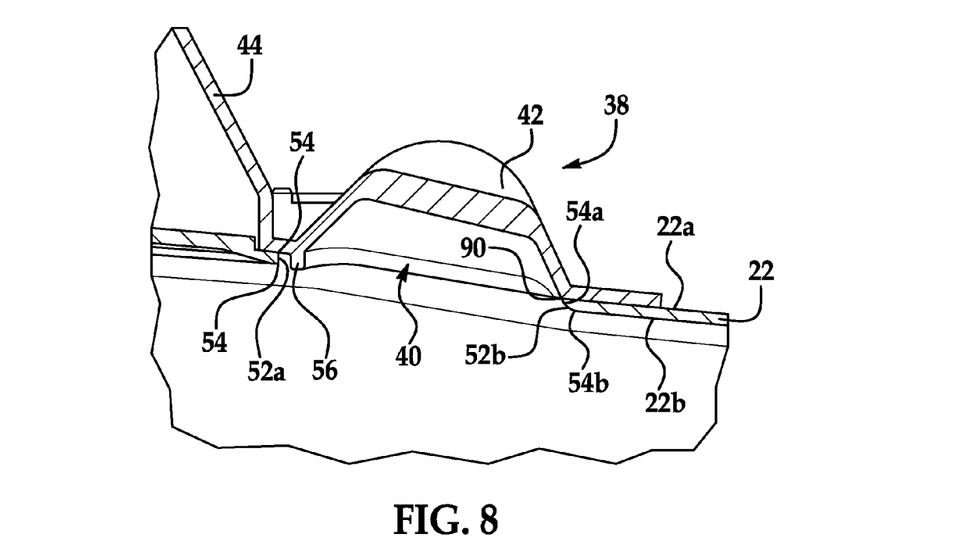
FIG. 8 is a cross section of the light housing and perimeter edge of FIG. 6 taken along the line 8-8.

FIG. 8 is a cross section of the light housing 42 and perimeter edge 52 of FIG. 6 taken along the line 8-8. As shown in FIG. 8, the light assembly 38 includes the light housing 42 in alignment with the light aperture 40 such that light from the light housing 42 can pass though the light aperture 40 to illuminate the storage cavity 32. The corner 54b between the interior surface 22b and the forward edge 52b of the perimeter edge 52 is rounded. The corner 54b is rounded outward with respect to the light aperture 40 such that a continuous smooth contact surface 90 is formed. Continuous smooth contact surface 90 begins at an interior of the light housing 42, includes the rounded corner 54b, and continues along the interior surface 22b of the top wall 22.

Figure 9:
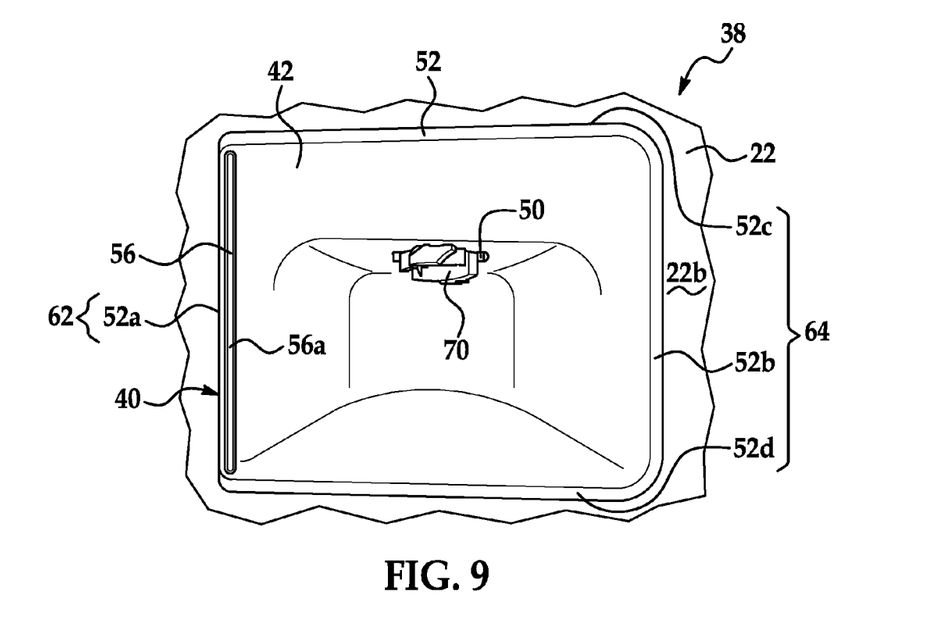
FIG. 9 is a bottom elevation view of an alternative embodiment of a light housing and a perimeter edge.
Figure 10:
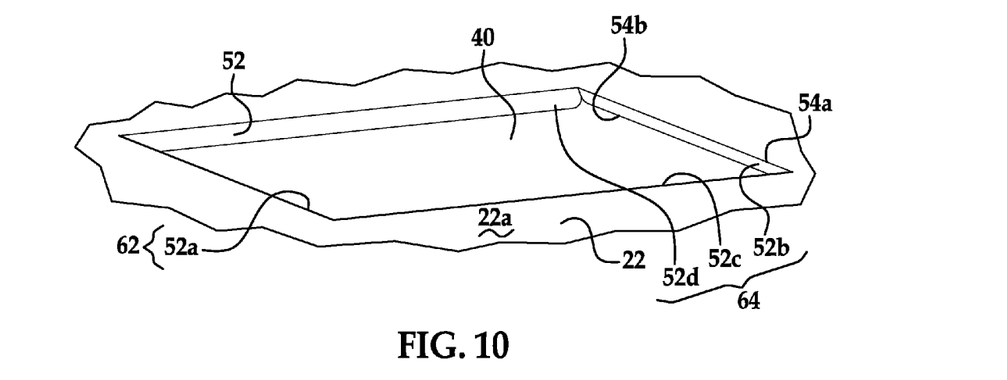
FIG. 10 is a top perspective view of the perimeter edge shown in FIG. 9.

FIG. 9 is a bottom elevation view of an alternative embodiment of a light housing 42 and a perimeter edge 52 defining a light aperture 40. As shown in FIG. 9, the perimeter edge 52 has a first portion 62 and a second portion 64. The first portion 62 of the perimeter edge 52 includes the rearward edge 52a, and the flange 56 includes segment 56a extending along the first portion 62. The second portion 64 of the perimeter edge 52 includes the forward edge 52b and each of the side edges 52c and 52d. One or more of the corners 54 of the perimeter edge 52 can be rounded along the second portion 64. FIG. 10 is a perspective top view of the perimeter edge 52 shown in FIG. 9. The forward edge 52b and the side edges 52c and 52d of the perimeter edge 52 have a corner 54a at the intersection with the top surface 22a of the wall 22 and a corner 54b at the intersection with the interior surface 22b of the wall 22. As illustrated in FIG. 10, the corner 54b along the interior surface 22b can be rounded along the second portion 64 of the perimeter edge 52.

Figure 11:
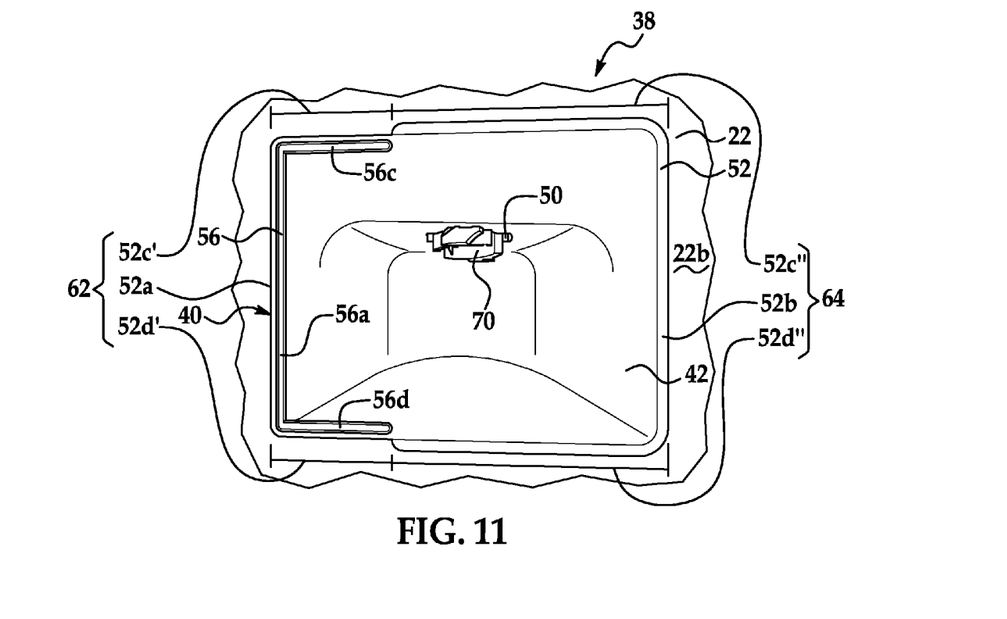
FIG. 11 is a bottom elevation view of an alternative embodiment of a light housing and a perimeter edge.
Figure 12:
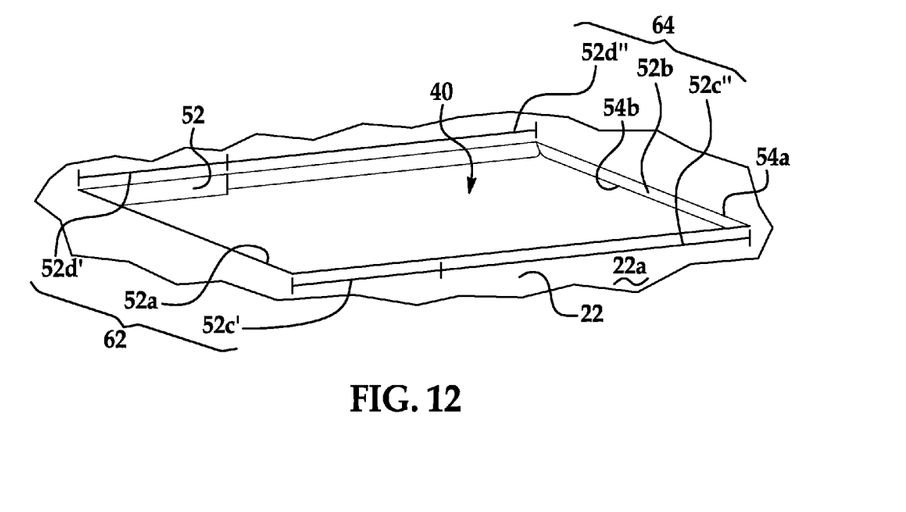
FIG. 12 is a top perspective view of the perimeter edge shown in FIG. 11.

FIG. 11 is a bottom elevation view of an alternative embodiment of a light housing 42 and a perimeter edge 52 defining a light aperture 40. As shown in FIG. 11, the perimeter edge 52 has a first portion 62 and a second portion 64. The first portion 62 of the perimeter edge 52 includes the rearward edge 52a, a part 52c' of side edge 52c adjacent to the rearward edge 52a and a part 52d' of side edge 52d adjacent to the rearward edge 52a. The flange 56 is continuous and includes segments 56a, 56c and 56d extending along the first portion 62. The second portion 64 of the perimeter edge 52 includes the forward edge 52b, a part 52c" of side edge 52c adjacent to the forward edge 52b and a part 52d" of side edge 52d adjacent to the forward edge 52b. One or more of the corners 54 of the perimeter edge 52 can be rounded along the second portion 64. FIG. 12 is a perspective top view of the perimeter edge 52 shown in FIG. 11. The forward edge 52b, a part 52c" of side edge 52c adjacent to the forward edge 52b and a part 52d" of side edge 52d adjacent to the forward edge 52b have a corner 54a at the intersection with the top surface 22a of the wall 22 and a corner 54b at the intersection with the interior surface 22b of the wall 22. As illustrated in FIG. 12, the corner 54b along the interior surface 22b can be rounded along the second portion 64 of the perimeter edge 52.

The illustrated embodiments of a rounded corner 54b are provided by way of example only. The second portion 64 of the perimeter edge 52 with the rounded corner 54b can be provided in all or any portions of the perimeter edge 52. The second portion 64 can alternatively be provided in a plurality of portions of the perimeter edge 52. Further, although the corner 54b is described as being rounded, the corner 54b could alternatively be rounded, chamfered or otherwise smoothed or softened.

As disclosed herein, embodiments of the glove box assembly 20 can include a light aperture 40 defined by a perimeter edge 52 and a light housing 42 having any combination of the flange 56 extending along the first portion 62 of the perimeter edge and the rounded corner 54b along the second portion of the perimeter edge. In other words, all combinations of the following are contemplated: the flange 56 can extend from no portion, any portion or all of the light housing 42; and the corner 54b between the perimeter edge 52 and the interior surface 22b can be rounded along no portion, any portion or the entire perimeter edge 52. The objective of any combination disclosed is to balance at least the following: cost, assembly time, installation time, perception of quality and optimum storage space.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A glove box assembly defining a storage cavity for a vehicle comprising:
   a glove box wall having an exterior surface and an interior surface and a light aperture there through having a perimeter edge extending between the exterior surface and the interior surface of the glove box wall;
   a light housing adjacent to the exterior surface of the glove box wall and aligned with the light aperture; and
   a flange extending from the light housing into the light aperture adjacent to at least a portion of the perimeter edge of the light aperture such that a distal end of the flange is flush with the interior surface of the glove box wall, wherein the distal end of the flange, when viewed in cross-section, is rounded along a length of the flange to remove sharp edges.

2. The glove box assembly of claim 1, wherein the flange is annular and extends adjacent to an entire circumference of the perimeter edge.

3. The glove box assembly of claim 1, wherein the glove box wall forms part of a ceiling of the storage cavity, the glove box assembly further comprising a glove box cover forming a remainder of the ceiling and extending adjacent to the exterior surface of the glove box wall, wherein the light housing is integrally formed with the glove box cover such that the light housing aligns with the light aperture of the glove box wall when the glove box cover extends adjacent to the exterior surface of the glove box wall.

4. The glove box assembly of claim 1, wherein the flange is adjacent to a portion of the perimeter edge closest to an access opening of the storage cavity.

5. The glove box assembly of claim 1, wherein:
   the perimeter edge of the light aperture consists of a first portion and a second portion along a length of the perimeter edge; and
   the flange extends into the light aperture adjacent only to the first portion of the perimeter edge.

6. The glove box assembly of claim 5, wherein a corner at the intersection of the perimeter edge and an interior surface of the wall is rounded along the second portion of the perimeter edge.

7. The glove box assembly of claim 5, wherein the perimeter edge includes a rearward edge, a forward edge and a pair of opposing side edges.

8. The glove box assembly of claim 7, wherein the first portion of the perimeter edge is the rearward edge and the side edges, and the flange extends along the rearward edge between the side edges and along the side edges between the rearward edge and the forward edge only.

9. The glove box assembly of claim 7, wherein:
   the first portion of the perimeter edge is the rearward edge and a first part of the side edges adjacent to the rearward edge; and
   the second portion of the perimeter edge is the forward edge and a second part of the side edges adjacent to the forward edge.

10. The glove box assembly of claim 7, wherein:
    the first portion of the perimeter edge is the rearward edge; and
    the flange extends only along the rearward edge and between the pair of side edges.

11. The glove box assembly of claim 10, wherein the second portion of the perimeter edge is the forward edge and the side edges.

12. A glove box assembly defining a storage cavity for a vehicle comprising:

a glove box wall comprised of a fixed wall and a cover portion, the fixed wall having an exterior surface and an interior surface and a light aperture there through having a perimeter edge extending between the exterior surface and the interior surface of the glove box wall;

the cover portion extending exterior to and adjacent to the exterior surface of the fixed wall, the cover portion including a light housing aligned with the light aperture of the fixed wall; and a flange extending from the light housing into the light aperture adjacent to at least a portion of the perimeter edge such that a distal end of the flange is flush with the interior surface of the glove box wall.

13. The glove box assembly of claim 12, wherein the flange extends from at least a portion of a circumference of the light housing and the distal end of the flange is rounded.

14. The glove box assembly of claim 13, wherein the portion of the circumference from which the flange extends is a portion closest to a glove box opening.

15. A glove box assembly defining a storage cavity for a vehicle comprising:

a glove box wall having an exterior surface and an interior surface and a light aperture there through having a perimeter edge extending between the exterior surface and the interior surface of the glove box wall;

a light housing adjacent to the exterior surface of the glove box wall and aligned with the light aperture; and a flange extending from a portion of an open end of the light housing into the light aperture adjacent to the perimeter edge of the light aperture such that a distal end of the flange opposite the light housing is flush with the interior surface of the glove box wall, with edges of the distal end of the flange rounded when viewed in cross-section, wherein a corner formed from the perimeter edge of the light aperture and the interior surface of the glove box wall is rounded when viewed in cross-section such that the distal end of the flange and the corner form a continuous rounded perimeter adjacent the storage cavity.

* * * * *